TRANSISTOR FREQUENCY DISCRIMINATOR CIRCUITS

Filed Feb. 26, 1963 7 Sheets-Sheet 1

INVENTOR.
Werner Steiger,
BY
Paul M. Coble
ATTORNEY.

Feb. 15, 1966 W. STEIGER 3,235,811

TRANSISTOR FREQUENCY DISCRIMINATOR CIRCUITS

Filed Feb. 26, 1963 7 Sheets-Sheet 4

TRANSISTOR FREQUENCY DISCRIMINATOR CIRCUITS

Filed Feb. 26, 1963

7 Sheets-Sheet 6

Feb. 15, 1966 W. STEIGER 3,235,811

TRANSISTOR FREQUENCY DISCRIMINATOR CIRCUITS

Filed Feb. 26, 1963 7 Sheets-Sheet 7

3,235,811
TRANSISTOR FREQUENCY DISCRIMINATOR CIRCUITS

Werner Steiger, Anaheim, Calif., assignor to Hughes Aircraft Company, Culver City, Calif., a corporation of Delaware Filed Feb. 26, 1963, Ser. No. 261,047
25 Claims. (Cl. 329—103)

This invention relates to frequency discrimination and more particularly relates to simple and compact freqeuncy discriminator circuits employing only transistors, resistors, and capacitors.

One type of frequency discriminator which has been used in the past includes a pair of tuned LC circuits, one resonant above the upper deviation frequency limit of the discriminator and the other resonant below the lower deviation frequency limit. The voltage developed across each tuned circuit is a function of the frequency of the input signal, and the tuned circuit voltages are algebraically combined to produce a discriminator output proportional to the frequency deviation of the input signal from a center frequency between the two resonant frequencies. Although discriminators of the tuned LC circuit type possess high sensitivities, they necessarily require the employment of inductances, making miniaturization difficult, especially at low frequencies.

Another class of prior art frequency discriminators is the pulse averaging type in which pulses of constant width are produced in response to the successive leading edges of a clipped frequency modulated input waveform, with the spacing between the constant width pulses varying in accordance with the frequency of the input waveform. These constant width pulses are sent through a low pass averaging circuit to provide a D.C. voltage, the amplitude of which is proportional to the frequency of the input signal. Although the pulse averaging type of discriminator does not require inductances, and has greater linearity and bandwidth than the tuned circuit discriminator, the latter has the advantages of greater simplicity and higher sensitivity.

It is, therefore, an object of the present invention to provide a simple, compact, and reliable frequency discriminator circuit which has a high sensitivity and which does not require the use of any inductance.

It is a further object of the present invention to provide a frequency discriminator which possesses the advantages of both tuned circuit and pulse averaging discriminators and which is also less expensive and more readily miniaturized than either of these prior art circuits.

It is a further object of the present invention to provide a circuit which performs frequency demodulation with only a single transistor, a resistor, and two capacitors.

It is a still further object of the present invention to provide a simple transistorized frequency discriminator circuit in which either positive or negative feedback may be employed to obtain desired discriminator sensitivity.

It is a still further object of the present invention to provide a transistorized frequency discriminator circuit with frequency dependent feedback which automatically adjusts the discriminator sensitivity to minimize the effect of frequency drift and other low frequency noise.

It is still another object of the present invention to provide a reliable and economical push-pull frequency discriminator circuit employing two complementary transistors.

It is a still further object of the present invention to provide a reliable and economical frequency discriminator circuit employing two complementary transistors and providing a single-ended output.

It is yet another object of the present invention to provide a frequency discriminator circuit employing two complementary transistors and which circuit possesses separate center frequency and sensitivity controls, with minimum effect of either control on the controlled parameter of the other.

It is a still further object of the present invention to provide a frequency discriminator circuit employing two complementary transistors and in which the center frequency may be adjusted by means of an electrical control signal.

It is still another object of the present invention to provide a transistorized frequency-selective gating circuit which passes an input signal only if the frequency of the gating signal is within a predetermined frequency range determined by the sensitivity of the circuit.

It is a still further object of the present invention to provide a bistable frequency discriminator circuit which provides an output at a first level when the frequency of the input signal is above a predetermined frequency and which provides an output at a different level in response to an input signal frequency below a preselected frequency.

In accordance with the foregoing objectives, the present invention provides a frequency discriminator circuit comprising a signal translating semiconductor device, such as a transistor having an emitter, a collector, and a base. A resistance device is connected to the base, with a first capacitance device being connected between the base and emitter. A varying frequency signal is applied between the emitter and a conductive element, and a second capacitance device is connected between the conductive element and the collector. A signal is developed across the second capacitance device which has an amplitude determined by the frequency deviation of the varying frequency signal from a given frequency.

A control signal may be applied between the emitter and the resistance device. The control signal may be either an auxiliary voltage or a positive or negative feedback voltage. Negative feedback may be provided by connecting the resistance device between the base and collector of the transistor. Positive feedback may be afforded by inverting the signal developed across the second capacitance device and applying at least a portion of the inverted signal, for example through a variable tap of a potentiometer, to the base of the transistor. The feedback may also be made frequency dependent by resistivity connecting the end of the resistance device electrically remote from the base to the collector of the transistor and capacitatively connecting this end of the resistance device to the variable tap of the potentiometer.

In accordance with a further embodiment of the invention a push-pull frequency discriminator circuit is provided which employs first and second transistors of complementary types. The emitters of the transistors are connected together, while first and second capacitance devices are connected between the emitter and base of the respective transistors, with the bases of the transistors being interconnected by resistance means. A frequency modulated input signal is applied across first and second terminals, with the first terminal being connected to the emitters of the transistors. A third capacitance device is connected between the collector of the first transistor and the second terminal, while a fourth capacitance device is connected between the collector of the second transistor and the second terminal. A demodulated output signal is provided across the third and fourth capacitance devices.

A single-ended frequency discriminator employing two transistors of complementary types may be provided in accordance with a further embodiment of the present invention. The single-ended circuit is similar to the push-pull circuit except that the fourth capacitance device is connected between the first input terminal and the emitters of the transistors, and the output is provided across the third capacitance device.

First and second resistance means may be connected in series between the bases of the two transistors, with third resistance means connected between the second terminal and the junction between the first and second resistance means. Separate center frequency and sensitivity controls may be provided by using a variable resistor for the first resistance means and a variable tap potentiometer for the second resistance means, and by connecting the third resistance means to the potentiometer tap.

By applying an electrical control signal to the base of one of the transistors, a frequency discriminator circuit with an electrically adjustable center frequency may be provided.

A frequency selective gating circuit which passes an input signal only if the frequency of the gating signal is within a predetermined frequency range may be provided by applying the gating signal across the first and second terminals, and applying the input signal between the second terminal and a third terminal which is coupled through a series resistor and capacitor to the base of the second transistor.

The complementary transistor discriminator circuit may also be made bistable to provide an output signal at a first level when the frequency of the input signal is above a predetermined frequency and to provide an output signal at a different level when the frequency of the input signal is below a preselected frequency.

Other and further objects, advantages, and characteristic features of the present invention will become readily apparent from the following detailed description of preferred embodiments of the invention when taken in conjunction with the appended drawings in which.

Figure 1:
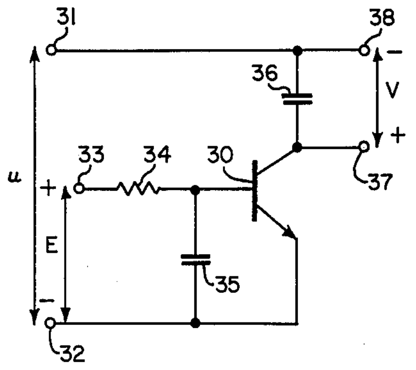
FIG. 1 is a schematic circuit diagram of the circuit of the present invention in its generalized form.

Referring now to the drawings, and in particular to FIG. 1, the basic circuit of the present invention is illustrated in a manner facilitating analysis of the circuit in its generalized form. As is shown, the circuit is constructed around a signal translating semiconductor device 30, illustrated as an NPN transistor although it is to be understood that other devices such as PNP transistors may be used equally well. A frequency modulated input signal designated by $u$ is applied across a pair of input terminals 31 and 32. The terminal 32 is connected to the emitter of transistor 30, while a capacitor 36 is connected between the input terminal 31 and the collector of the transistor 30. A bias voltage E, which will be referred to as a control voltage, is applied to the circuit between the terminal 32 and a control terminal 33, with the control terminal 33 being connected to the base of transistor 30 via a resistor 34. The control voltage E may be obtained, for example, from any convenient source of potential such as a battery. A capacitor 35 is connected between the base and emitter of the transistor 30 to form a low pass filter network together with the resistor 34. The demodulated output voltage designated by $v$ is developed across the capacitor 36 and may be provided between a pair of output terminals 37 and 38, with the terminal 37 being connected to the collector of transistor 30 and terminal 38 being connected to the input terminal 31. The reference polarities which will be used in the following discussion are as indicated in FIG. 1.

The operation of the circuit of FIG. 1 will first be discussed qualitatively in terms of the circuit behaviour at low, high and intermediate frequencies, after which a mathematical analysis will be given for the circuit operation at a generalized intermediate frequency. For purposes of analysis the input voltage $u$ will be assumed to be a square wave of a peak-to-peak amplitude which varies from +U to −U, although it is to be understood that the input signal may have a variety of waveforms such as sinusoidal, triangular, etc., a square wave being chosen for illustrative purposes on account of its simpler analysis and since in practice the discriminator is normally preceded by a limiter.

Figure 3:
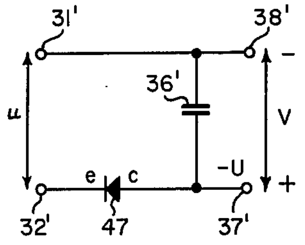
FIG. 3 shows a simplified equivalent circuit representing the behavior of the circuit of FIG. 1 at low frequencies.
Figure 2:
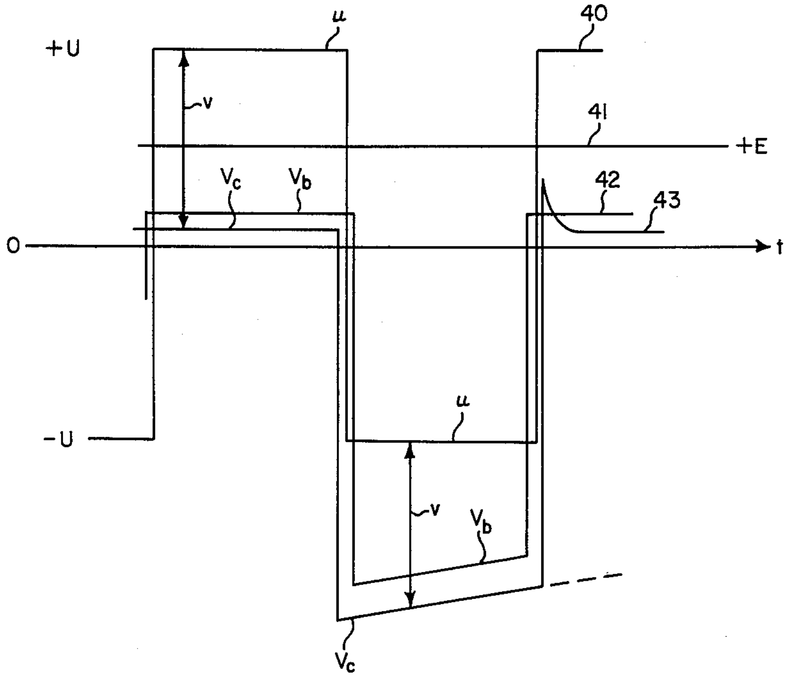
FIG. 2 is a graph illustrating waveforms at various points of the circuit of FIG. 1 for low frequency signals.

Consider the operation of the circuit of FIG. 1 at extremely low frequencies, with reference to the waveforms illustrated in FIG. 2. In this figure the input voltage $u$ is indicated by the waveform 40; the control voltage E is shown at a level 41 intermediate in value between zero and +U; the base voltage $V_b$ of the transistor 30 with respect to the emitter voltage (which is at a reference level of zero volts) is indicated by the waveform 42; and the collector voltage $V_c$ as referenced to the emitter voltage is illustrated by the waveform 43. The frequencies are assumed to be sufficiently low so that the capacitor 35 may be neglected. When the input voltage $u$ is at the level +U the transistor 30 is forward biased, and current flows from the collector to the emitter, charging the capacitor 36 negatively at the collector side, i.e., at the output terminal 37. When the input voltage $u$ changes to a level of —U the collector voltage $V_c$ is driven more negative than the input voltage $u$ by an amount equal to the voltage across the capacitor 36, with the base voltage $V_b$ remaining slightly more positive than the collector voltage $V_c$. Since the base is now negative with respect to the emitter, the base-emitter junction becomes reverse biased, and current ceases to flow through the base-emitter path of the transistor. However, a small current does flow from the control terminal 33 through the resistor 34 and the forward biased base-collector junction of the transistor to reduce slightly the charge across the capacitor 36, causing a slight rise in the voltages $V_c$ and $V_b$ during the negative portion of the input cycle. When the input voltage $u$ again becomes positive, the collector voltage $V_c$ follows the input and initially becomes slightly positive with respect to both the base and the emitter. The base becomes positive with respect to the emitter, and base-emitter current again flows through the transistor 30, with the resulting flow of collector-emitter current replacing the charge on the capacitor 36 which was lost during the negative portion of the input cycle. Thus, at low frequencies the circuit of FIG. 1 behaves like the simplified equivalent circuit illustrated in FIG. 3 (in which corresponding circuit components bear the same reference numerals as in FIG. 1 except with the addition of a prime designation), with the collector-emitter path of the transistor 30 acting like a diode 47, and the output voltage $v$ developed across the capacitor 36' (which is the difference between the voltages at the terminals 37' and 38') approaching —U under ideal conditions.

Figure 5:
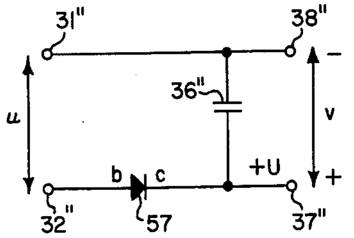
FIG. 5 illustrates a simplified equivalent circuit depicting the high frequency behaviour of the circuit of FIG. 1.
Figure 4:
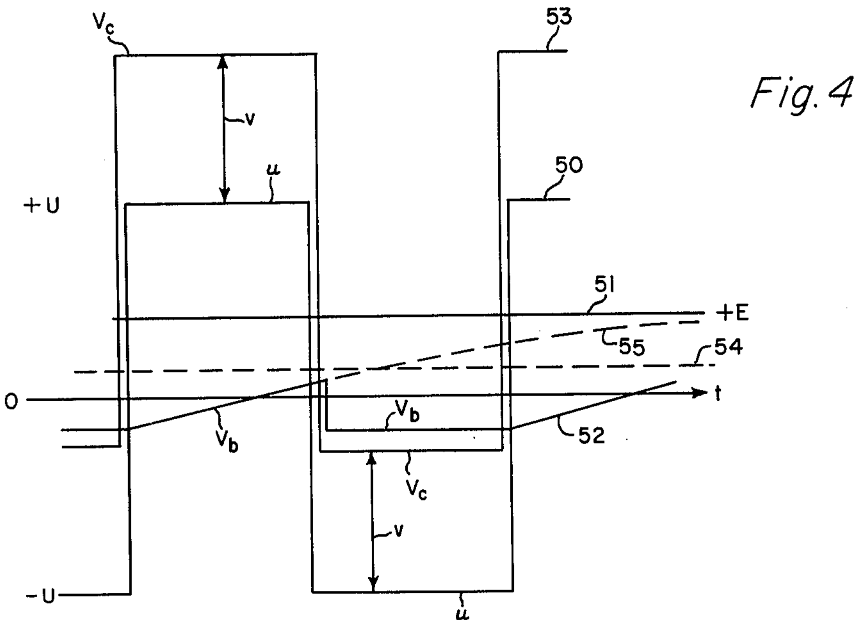
FIG. 4 is a graph illustrating waveforms at various points of the circuit of FIG. 1 for high frequency signals.

Waveforms illustrative of the operation of the circuit of FIG. 1 at extremely high frequencies are given in FIG. 4, with the input voltage $u$ being indicated by the waveform 50, the control voltage E being designated by the line 51, the base voltage $V_b$ of the transistor 30 being shown by the waveform 52, the collector voltage $V_c$ being illustrated by the waveform 53, and the level of base voltage necessary for forward conduction of the base-emitter junction being depicted by the dashed line 54. In the high frequency case the period of the input signal is extremely short compared with the time constant of the network comprising resistor 34 and capacitor 35. Therefore, as shown in FIG. 4, although the base voltage $V_b$ begins a rise toward the value +E along an exponential curve 55 at the onset of each positive-going portion of the input waveform, it never reaches the level 54 necessary for base-emitter current flow. Thus, during the positive portions of the input waveform $u$ neither junction of the transistor is conductive. When the input voltage becomes negative, the voltage $V_c$ at the collector is driven negative, although it remains more positive than the input voltage by an amount corresponding to the charge accumulated across the capacitor 36. During the negative portions of the input waveform the base voltage $V_b$ is maintained sufficiently negative with respect to the emitter that reverse bias of the base-emitter junction is ensured. However, the base-collector junction is forward biased, and a small current flows through resistor 34 and the base-collector junction of the transistor 30 to the capacitor 36, replenishing any charge lost during the preceding positive portion of the input cycle. When the input voltage returns to a value of +U, the base voltage $V_b$ is released and rises toward the control voltage E as the capacitor 35 charges. However, the input voltage $u$ returns to the value —U before the base voltage is able to increase sufficiently to render the base-emitter junction conductive, and the base voltage $V_b$ is again clamped at a level slightly more positive than the collector voltage $V_c$, with the capacitor 35 discharging during the negative portion of the input cycle. Thus, for high frequency operation the output voltage $v$ developed across the capacitor 36 (which is the difference between the voltages at the terminals 37 and 38) resides at an essentially constant voltage slightly smaller than +U. The high frequency equivalent circuit is illustrated in FIG. 5 (in which corresponding circuit components again bear the same reference numerals as in FIG. 1 except with a double prime designation), with the base-collector junction of the transistor 30 now functioning as a diode 57. It is pointed out that since the charging current for the capacitor 36 must flow through the resistor 34 in the high frequency case, output loading has a greater effect at high frequencies than at low frequencies. On the other hand, the effect of increased input scource resistance is greater at low frequencies.

Figure 6:
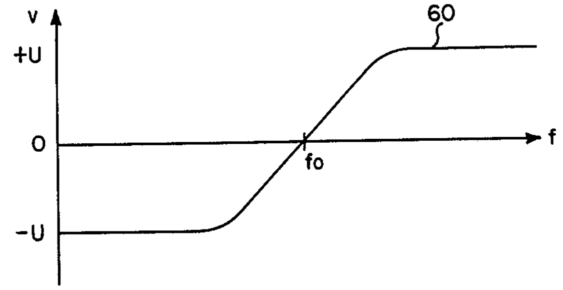
FIG. 6 is a graph illustrating the output vs. frequency characteristics of the circuit of FIG. 1.

The results of the foregoing analyses at the high and low frequency extremes are summarized in FIG. 6. In this figure the curve 60 illustrates the output voltage $v$ as a function of the frequency $f$ of the input signal $u$. At low frequencies an output voltage approaching —U is produced, and the base-emitter junction of the transistor 30 has a conduction angle (portion of the input signal cycle during which the base-emitter junction is conductive) of 80°. At high frequencies the output voltage approaches +U, with the conduction angle of the base-emitter junction being 0°. At intermediate frequencies a continuous transition occurs between the aforementioned outputs at the frequency extremes. Thus, the conduction angle of the base-emitter junction decreases from 180° to 0°, and the output voltage $v$ increases from —U to +U as the frequency is increased from low to high frequencies, with an output of zero magnitude occurring at a frequency $f_0$ (see FIG. 6). It is pointed out that the graph of FIG. 6 applies when the transistor 30 is of the NPN type; for a PNP transistor the graph is reversed, i.e., the output voltage approaches +U at low frequencies, decreases through zero as the frequency is increased, and approaches —U at high frequencies.

Figure 7:
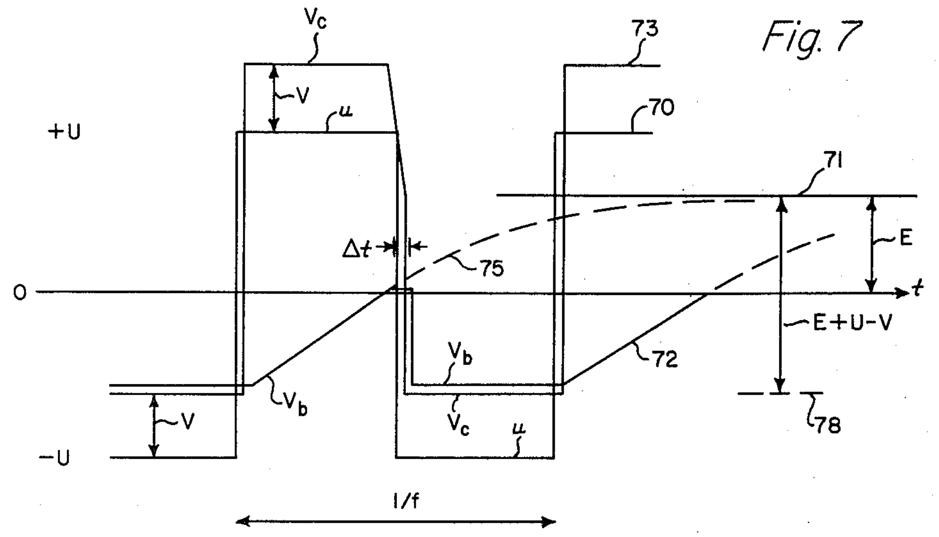
FIG. 7 is a graph illustrating waveforms at various points of the circuit of FIG. 1 for an input frequency slightly above the center frequency.

Waveforms for the general case in the intermediate frequency transition region at an input frequency slightly above the frequency $f_0$ are illustrated in FIG. 7. The input voltage $u$ for a square wave input of peak amplitude U is depicted by the waveform 70; the line 71 represents the control voltage E; the voltage $V_b$ at the base of the transistor 30 (with respect to the emitter) is given by the waveform 72; and the collector voltage $V_c$ (with respect to the emitter) is shown by the waveform 73. The capacitance of the capacitor 36 is sufficiently large to prevent the input frequency from appearing across the output terminals 37 and 38. Therefore, the waveform at the collector of the transistor 30 is essentially the same as the input waveform, except that it is shifted positively (since in FIG. 7 an input frequency slightly above $f_0$ is assumed) with respect to the input waveform by an amount equal to the magnitude V of the output voltage $v$ across the capacitor 36.

Assume that during the negative portions of the input waveform $u$ the base-collector junction of the transistor 30 is forward biased and conducts as a separate diode, which assumption will be seen to be correct after a complete cycle of the input waveform has been discussed. The collector voltage $V_c$ of the transistor 30 is at a value of $V—U$, while the base voltage $V_b$ is at a value very slightly above $V—U$, which condition continues until the input waveform changes to its positive value of +U. Then both the base-emitter and the base-collector junctions are reverse biased. There is no conduction through the transistor 30, and the base voltage $V_b$ rises toward the control voltage E along an exponential curve 75, as current flows from terminal 33 through resistor 34 to charge capacitor 35. Before the input voltage $u$ returns to its negative condition the base voltage $V_b$ will have risen above the emitter voltage (ground in FIG. 7) causing the transistor 30 to conduct collector-emitter current and thereby initiating discharging of the capacitor 36. The transistor 30 is conductive for a very short time $\Delta t$, after which the input voltage $u$ returns to its negative condition. The negative going input waveform terminates this conduction by reverse biasing the base-emitter junction, leaving the base-collector junction forward biased so that it can conduct as a separate diode. Current thus flows from the control terminal 33 and through the base-collector junction to recharge the capacitor 36 to its previous value.

As has been mentioned above, for an input frequency slightly above the frequency $f_0$ the transistor 30 conducts collector-emitter current for only a very short time $\Delta t$ (assuming a low input source impedance). Therefore, by assuming a negligible conduction angle in the intermediate frequency transition region, the following first order mathematical analysis may be made for the circuit of FIG. 1, with reference to the waveforms shown in FIG. 7.

Neglecting the forward voltage drop across the base-collector junction, it will be apparent from FIG. 7 that commencing with the time when the input voltage changes from $-U$ to $+U$, the base voltage $V_b$ rises from a level indicated by the dashed line 78 toward the control voltage E which is at the level indicated by the line 71 along an exponential curve 75. The time constant T of the exponential rise is given by:

$$T=R_1C_1 \qquad (1)$$

where $R_1$ is the resistance of resistor 34, and $C_1$ is the capacitance of capacitor 35. The distance $x$ between the lines 71 and 78 is equal to $E+U-V$, and by referencing the level of the line 71 to zero, the curve 75 may be described by the equation:

$$x=-(E+U-V)e^{-t/T} \qquad (2)$$

Since the conduction angle of the base-emitter junction is assumed to be essentially zero, and neglecting the forward voltage drop across the base-emitter junction, the distance $x$ becomes equal to $-E$ at the midpoint of the input waveform period, i.e., at time $$t=\frac{1}{2f}$$

Substituting these values into Equation 2 gives:

$$E=(E+U-V)e^{-1/2fT} \qquad (3)$$

Equation 3 may be solved for the output voltage V to yield:

$$V=U+E(1-e^{1/2fT}) \qquad (4)$$

In order to obtain general results, the control voltage E is made a linear function of both input voltage magnitude U and the output voltage magnitude V according to the relation:

$$E=\alpha U-\beta V \qquad (5)$$

and in order to simplify the resulting equations, the output voltage is normalized with respect to the input voltage by defining a quantity A as:

$$A=\frac{V}{U} \qquad (6)$$

Substituting Equations 5 and 6 into Equation 4 and solving for A gives:

$$A=\frac{1+\alpha(1-e^{1/2fT})}{1+\beta(1-e^{1/2fT})} \qquad (7)$$

Since the center frequency $f_0$ is defined as that frequency at which the output is zero, by letting $f=f_0$ and setting $A=0$ in Equation 7, and solving the resulting equation for $f_0$, an expression for the center frequency is obtained as:

$$f_o=\frac{1}{2T\ln\left(1+\frac{1}{\alpha}\right)} \qquad (8)$$

It may be observed from Equation 8 that the center frekuency $f_0$ is influenced by the time constant T and the coefficient $\alpha$ but is independent of the coefficient $\beta$ (which represents a feedback factor from the output to the control input). Since it is a function of $\alpha$, the center frequency $f_0$ may be voltage controlled, as will be discussed more fully below.

In applying the principles discussed above to the development of practical circuits, it is helpful to define a sensitivity S for the discriminator (which represents the ratio of the normalized output variation to the normalized input variation) according to the relation:

$$S=\frac{\Delta V/U}{\Delta f/f}\approx f\frac{dA}{df} \qquad (9)$$

Differentiating Equation 7 with respect to $f$ and substituting the result in Equation 9 gives:

$$S=\frac{(\alpha-\beta A)[1+\alpha-A(1+\beta)]}{2fT(\alpha-\beta)} \qquad (10)$$

It may be observed from Equation 10 that the sensitivity S theoretically becomes infinite if $\alpha$ and $\beta$ are made equal. The sensitivity $S_0$ at the center frequency $f_0$ may be determined by setting $A=0$ and $f=f_0$ in Equation 10 and substituting Equation 8 in Equation 10 to yield:

$$S_0=\alpha\frac{(\alpha+1)}{(\alpha-\beta)}\ln\left(1+\frac{1}{\alpha}\right) \qquad (11)$$

Figure 8:
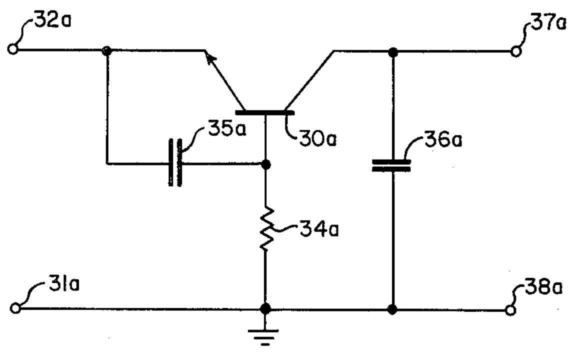
FIG. 8 is a schematic circuit diagram illustrating a specific configuration for the circuit of FIG. 1 designed without feedback.

In light of the foregoing discussion, specific cases of the generalized circuit of FIG. 1 will now be considered. A circuit design without feedback from output to input may be obtained by letting $\beta=0$ and, for simplicity, selecting $\alpha=1$. From Equation 5 it may be seen that the control voltage E thus becomes equal to the input voltage U. Such a circuit may be provided by connecting the control terminal 33 of the circuit of FIG. 1 to the input terminal 31, with the resulting circuit being illustrated in FIG. 8. Respective components of the circuit of FIG. 8 which are identical to those of the circuit of FIG. 1 are designated by the same respective reference numerals as their counterpart components of FIG. 1 except for the addition of the suffix "*a*." The sensitivity $S_0$ of the circuit of FIG. 8 is given by:

$$S_0=2\ln 2 \qquad (12)$$

Figure 9:
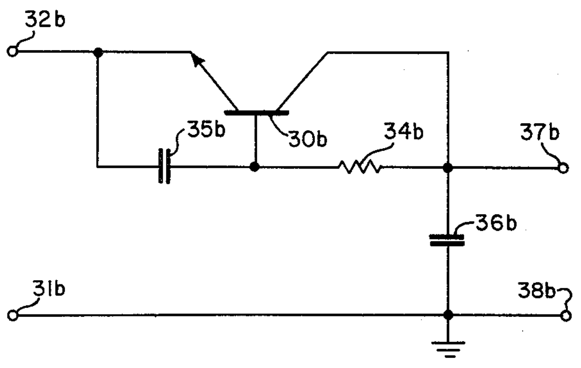
FIG. 9 is a schematic circuit diagram illustrating a specific configuration for the circuit of FIG. 1 in which negative feedback is provided.

An exemplarly circuit employing negative feedback may be obtained by letting $\alpha=1$ and $\beta=-1$ in Equation 5. Such a circuit is afforded when the control voltage E equals the sum of the input voltage U and the output voltage V, and may be obtained from the circuit of FIG. 1 by connecting the control terminal 33 to the output terminal 37. The resulting circuit is illustrated in FIG. 9. Respective components of the circuit of FIG. 9 which are identical to those of the circuit of FIG. 1 are designated by the same respective reference numerals as their counterpart components of FIG. 1 with the addition of the suffix "*b*." The center frequency sensitivity $S_0$ for the circuit of FIG. 9 is given by:

$$S_0=\ln 2 \qquad (13)$$

Figure 10:
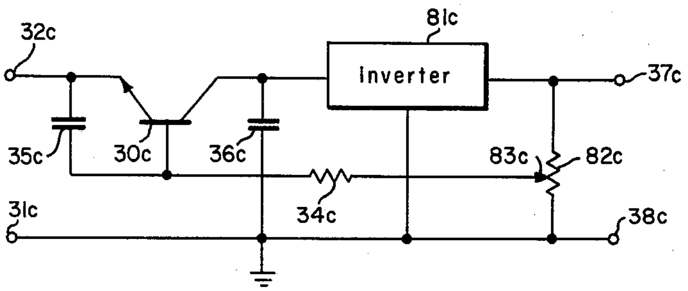
FIG. 10 is a schematic circuit diagram illustrating a specific configuration for the circuit of FIG. 1 in which positive feedback is provided.

It will be apparent from Equation 11 that when the feedback factor $\beta$ assumes positive values slightly less than unity, the denominator of Equation 11 becomes quite small, making the sensitivity high. This result may be achieved through the use of positive feedback, and a frequency discriminator circuit employing such feedback is illustrated in FIG. 10. Again, respective components of the circuit of FIG. 10 which are identical to those of the circuit of FIG. 1 are designated by the same respective reference numerals as their counterpart components in FIG. 1 except for the addition of the suffix "c." However, in the circuit of FIG. 10 the signal at the collector of the transistor 30c is fed to an inverter 81c, which may also be an amplifier, having its input terminals connected across the capacitor 36c and its output terminals connected to the respective output terminals 37c and 38c of the circuit. The inverter 81c may comprise a transistor or any other device which inverts the polarity of the signal appearing at its input. A potentiometer 82c having a variable tap 83c is connected across the output terminals 37c and 38c, with the tap 83c being connected to the end of base resistor 34c remote from the transistor 30c. By applying at least a portion of the inverted output signal back to the base of the transistor 30c regenerative feedback is provided which increases the sensitivity of the discriminator. Variation of the tap 83c of the potentiometer 82c affords selection of the desired feedback ratio $\beta$.

Figure 11:
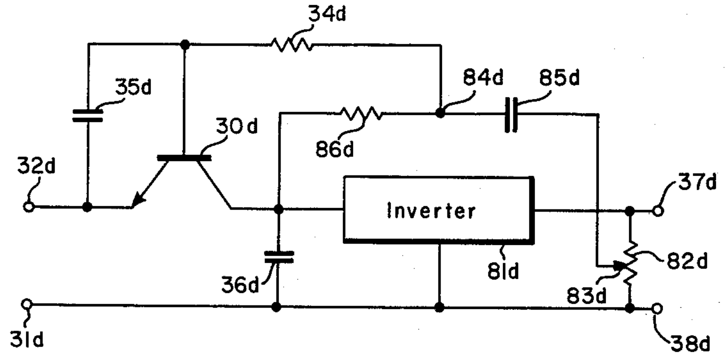
FIG. 11 is a schematic circuit diagram illustrating a specific configuration for the circuit of FIG. 1 in which frequency dependent feedback is provided.

In certain instances it is desirable to provide the discriminator with frequency dependent feedback, for example, employing negative feedback for very low frequency signals and positive feedback for signals at modulation frequencies. A discriminator circuit with such feedback is shown in FIG. 11. Respective components of the circuit of FIG. 11 which are identical to those of the circuit of FIG. 10 are designated by the same respective reference numerals as their counterpart components in the circuit of FIG. 10 except in FIG. 11 the suffix "d" replaces the suffix "c" used in FIG. 10. However, in the circuit of FIG. 11 the end of the base resistor 34d remote from the base of transistor 30d is connected to a junction terminal 84d instead of directly to the potentiometer tap 83d, and a capacitor 85d is interposed between the junction point 84d and the potentiometer tap 83d. A resistor 86d is connected between the collector of the transistor 30d and the junction point 84d.

For low frequencies the capacitor 85d presents a high impedance between output terminal 37d and the junction 84d, and a negative feedback path is provided from the collector of the transistor 30d through the resistors 86d and 34d to the base of the transistor. Thus, at low frequencies the circuit of FIG. 11 behaves like the circuit of FIG. 9. For high frequencies the capacitor 85d represents a relatively low impedance between the potentiometer tap 83d and the junction terminal 84d, providing a positive feedback path from the output terminal 37d through the capacitor 85d and resistor 34d to the base of the transistor 30d, and the circuit behaviour is essentially the same as that of the circuit of FIG. 10.

Figure 12:
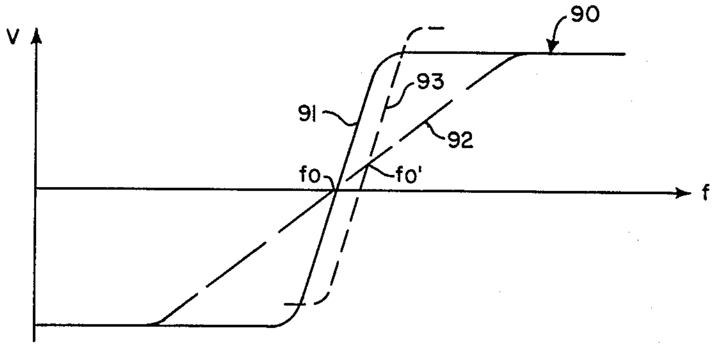
FIG. 12 is a graph illustrating output vs. frequency characteristics for the circuit of FIG. 11.

Advantages of the circuit of FIG. 11 may be more fully appreciated by making reference to the frequency characteristics shown in FIG. 12. When the demodulated output signal is at modulation signal frequencies, the positive feedback is in effect, and the circuit operates along the large slope (high sensitivity) region 91, shown in solid line, of the output vs. frequency characteristic curve 90. However, for low frequency noise, such as a slow drift in the center frequency from $f_0$ to $f_0'$, the demodulated signals are at frequencies sufficiently low so that the negative feedback path is employed, and for these frequencies the circuit operates along the long dashed curve 92 which has a smaller slope (and lower sensitivity) than the curve 91. Thus, the effect on the overall output signal of a slow drift in center frequency to $f_0'$ is minimized, and demodulation of modulation frequency signals for the new center frequency $f_0'$ occurs along the short dashed curve 93 which has the same large slope (and high sensitivity) as the curve 91. Thus, the circuit of FIG. 11 provides a self-adjusting discriminator with relatively low static and high dynamic sensitivity which minimizes the effect of frequency drift and other low frequency noise.

Figure 13:
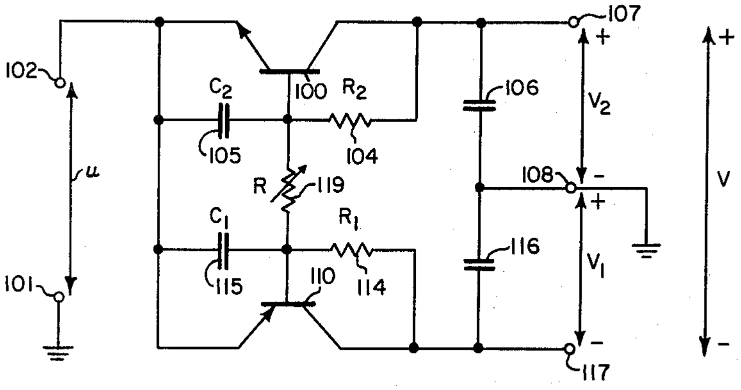
FIG. 13 is a schematic circuit diagram of a push-pull complementary transistor frequency discriminator circuit provided according to another embodiment of the present invention.

In accordance with a further embodiment of the present invention a frequency discriminator is provided which operates in a push-pull mode and in which the center frequency $f_0$ and the bandwidth of the discriminator may be readily adjusted. In this embodiment the circuit of FIG. 9 and a similar circuit employing a complementary transistor are combined by connecting their ground terminals together and providing a variable resistor between the bases of the two transistors. The resulting circuit, which is illustrated in FIG. 13, thus comprises a pair of transistors 100 and 110 of complementary types; for example the transistor 100 may be of the NPN type and the transistor 110 of the PNP variety as shown, or vice versa. The input signal $u$ is applied across input terminals 102 and 101, with the terminal 102 being connected to the emitter of the transistor 100 and the terminal 101 being connected to a level of reference potential indicated as ground in FIG. 13. The emitters of the transistors 100 and 110 are connected together, while their bases are interconnected by a variable resistor 119 which is used to adjust the center frequency and bandwidth of the circuit as will be explained in more detail below. Capacitors 105 and 115, respectively, are connected across the emitter-base terminals of the respective transistors 100 and 110, while resistors 104 and 114, respectively, are connected across the collector-base terminals of the respective transistors 100 and 110. The collector of the transistor 100 is connected to an output terminal 107 providing a voltage $v_2$ with respect to ground, while the collector of the transistor 110 is similarly connected to an output terminal 117 which provides a voltage $-v_1$ with respect to ground. Capacitors 106 and 116 are connected in series between the output terminals 107 and 117, with the junction between these capacitors being connected to a terminal 108 which is grounded. The capacitors 106 and 116 provide sufficiently large capacitances to prevent the input frequency from appearing at the output. The overall output $v=v_2+v_1$ is taken between the output terminals 107 and 117.

As was the case with the circuit of FIG. 1, the operation of the circuit of FIG. 13 will first be discussed qualitatively at low, high and intermediate frequencies, after which a mathematical analysis will be given for the circuit operation at a generalized intermediate frequency. For purposes of analysis the input signal $u$ will be assumed to possess a rectangular waveworm which varies in peak-to-peak amplitude from +U to −U although it is to be understood that in practice the input signal may have any of a variety of waveforms.

Figure 14:
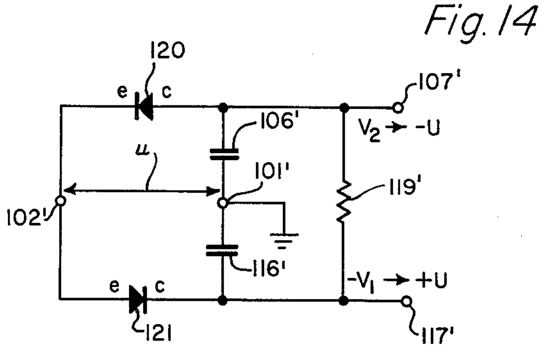
FIG. 14 illustrates a simplified equivalent circuit representing the low frequency behaviour of the circuit of FIG. 13.

At extremely low frequencies the capacitors 105 and 115 may be neglected, and the equivalent circuit shown in FIG. 14 may be drawn to illustrate the circuit behaviour at these frequencies. Respective circuit components in FIG. 14 corresponding to ones in FIG. 13 bear the same respective reference numerals as those in FIG. 13 except for the addition of a prime designation. The emitter-collector path of the transistor 100 of FIG. 13 behaves like the diode 120 of FIG. 14, while the emitter-collector path of the transistor 110 acts like the diode 121. The capacitors 106 and 116 charge sufficiently so that the output voltages $-v_1$ and $v_2$ approach the peak values +U and −U, respectively, of the input voltage. As long as the input voltage is between the two output voltages, the collector-base junctions of both transistors 100 and 110 conduct; and a current flows from the terminal 117 through the collector-base junction of the transistor 110, through the resistor 119, and through the base-collector junction of transistor 100 to the output terminal 107, thereby discharging the capacitors 106 and 116. Since the bases of the transistors 100 and 110 are at essentially the same potentials as the respective collectors, both emitter-base junctions are reverse biased, and the emitter currents are negligible (provided the inverse current gain of the transistors is sufficiently small). When the magnitude of the input voltage $u$ exceeds that of either of the output voltages, the emitter-base junction of the associated transistor 110 or 100 becomes forward biased. This transistor then conducts emitter-collector current in the normal manner, recharging the associated capacitor 116 or 106 to the level +U or −U, respectively.

Figure 15:
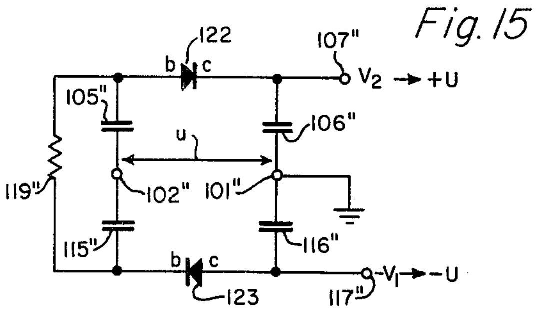
FIG. 15 shows a simplified equivalent circuit depicting the behaviour of the circuit of FIG. 13 at high frequencies.

At very high frequencies the circuit behaviour is similar to that of the equivalent circuit illustrated in FIG. 15, in which respective circuit components corresponding to those of FIG. 13 bear the same respective reference numerals as in FIG. 13 except for the addition of a double prime designation. The base-collector junction of the transistor 100 operates like the diode 122 of FIG. 15, while base-collector junction of the transistor 110 acts like the diode 123. At high frequencies the emitter-base junctions of the transistors 100 and 110 are non-conductive during the entire input signal cycle because the capacitors 105 and 115 are unable to charge sufficiently to overcome the reverse bias during the short time intervals between input signal alternations. However, the collector-base diodes are conductive and allow current to flow from the terminal 117 through the resistor 119 to the terminal 107. The capacitors 116 and 106 charge to the respective peak values of the input signals, with the voltage $-v_1$ at the terminal 117 approaching −U and the voltage $v_2$ at the terminal 107 approaching +U.

As the frequency of the input signal $u$ is increased from low to high frequencies, the conduction angles of the base-emitter junctions decrease, and the output voltages $-v_1$ and $v_2$ each change to the opposite polarity. Thus, the transition region existing between these two frequency extremes is of importance in analyzing the behaviour of the discriminator circuit.

Figure 16:
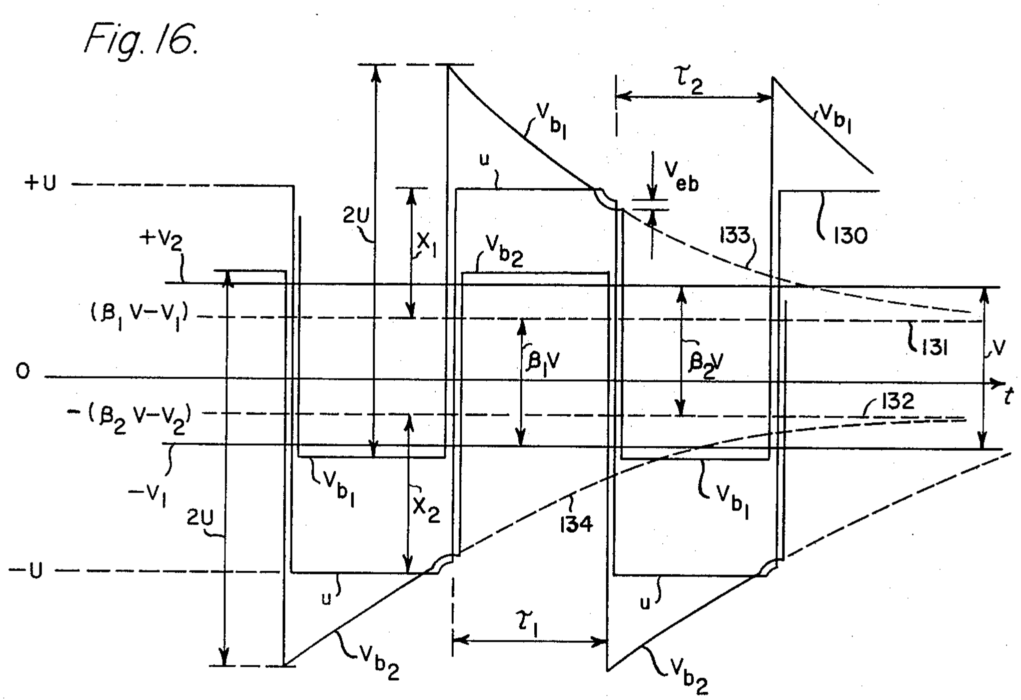
FIG. 16 is a graph illustrating waveforms at various points of the circuit of FIG. 13 for an input frequency slightly above the center frequency.

Waveforms for the general case in the intermediate frequency transition region at an input frequency slightly above the center frequency $f_0$ are illustrated in FIG. 16 for a rectangular input voltage supplied by a low impedance source. The input voltage $u$ resides at a peak value of +U for a period $\tau_1$ and at a level of −U for a period $\tau_2$. The output voltages $-v_1$ and $v_2$ are assumed to possess magnitudes of $V_1$ and $V_2$, respectively. The symbols $\beta_1$ and $\beta_2$ appearing in FIG. 16 designate feedback ratios which will be defined later on in the discussion. The waveform designated $V_{b_1}$ represents the voltage at the base of the transistors 110 with respect to ground, while the waveform $V_{b_2}$ designates the base voltage of the transistor 100 with respect to ground. The voltages (with respect to ground) at the collectors of the respective transistors 110 and 100 are $V_1$ and $V_2$, respectively while the common voltage (with respect to ground) appearing at the emitters of the two transistors is the input voltage $u$ which is illustrated by the waveform 130 of FIG. 16.

During the negative portion of the input waveform 130 the collector-base junction of transistor 110 conducts current as a separate diode because the collector voltage $V_1$ of the transistor 110 is slightly more positive than the base voltage $V_{b_1}$. The base voltage $V_{b_1}$ is more positive than the emitter voltage of the transistor 110 by an amount approximately equal to $U-V_1$, which corresponds to the charge across the capacitor 115. When the input voltage $u$ changes from −U to +U, the capacitor 115 initially causes the input voltage swing of +2U to appear at the base of the transistor 110. This makes the base voltage $V_{b_1}$ more positive than the collector voltage $V_1$ as well as the emitter voltage $u$, and thus, both the base-emitter and base-collector junctions of the transistor 110 are non-conductive. However, the capacitor 115 immediately begins to discharge by the flow of current through two distinct paths: one through the resistor 114 to the output terminal 117, and the other through the resistor 119 and the forward biased base-collector junction of the transistor 100 (since $V_{b_2}$ is now more positive than $V_2$) to the other output terminal 107. A time is reached at which the discharging of the capacitor 115 has progressed sufficiently to reduce the base voltage $V_{b_1}$ below the level U of the input voltage which is applied to the emitter of the transistor 110, causing the transistor 110 to conduct emitter-collector current and thereby charging the capacitor 116 in a positive direction. This conductive condition is illustrated in FIG. 16 in the region where the difference between the voltages $V_{b_1}$ and $u$ is labeled $V_{eb}$. Since the time when the base voltage $V_{b_1}$ drops below the emitter voltage $u$ occurs almost at the end of the positive portion $\tau_1$ of the input signal waveform, the time interval during which the emitter-base junction of the transistor 110 is conductive is very short.

When the input voltage returns to the level −U, the emitter-collector conduction of the transistor 110 is terminated due to the reverse bias applied across the emitter-base junction. During the initial portion of the downswing of the input voltage $u$, the capacitor 115 causes the base voltage $V_{b_1}$ to follow the changing input voltage applied to the emitter of the transistor 110. However, when the base voltage $V_{b_1}$ drop slightly below the collector voltage $V_1$, the collector-base junction of the transistor 110 becomes forward biased. This junction then conducts as a separate diode, with the resulting current flow through the collector-base junction recharging the capacitors 115 and 116 in a negative direction. Forward bias of the collector-base junction and reverse bias the emitter-base junction of the transistor 110 continues throughout the negative portion $\tau_2$ of the input waveform $u$.

The transistor 100 functions similarly to the transistor 110 except that its voltages change in opposite polarity and during alternate half cycles to those discussed above for the transistor 110. Thus, during the time interval $\tau_1$ the base-collector junction of the transistor 100 conducts as a separate diode, and during most of the time interval $\tau_2$ both junctions are non-conductive, with the transistor 100 conducting collector-emitter current for a short time interval prior to the end of $\tau_2$.

Before proceeding with the mathematical analysis, it is pointed out that the two discharge paths for each of the timing capacitors 105 and 115 influence the circuit operation in opposite ways. The currents through the resistor 119 provide positive feedback, while the currents through the resistors 104 and 114 provide negative feedback, with the slope of the output vs. frequency characteristic for the discriminator being largely determined by the relative values of these resistors. Therefore, in the ensuing analysis it proves convenient to define parameters $\beta_1$ and $\beta_2$ as:

$$\beta_1=\frac{R_1}{R+R_1} \tag{14}$$

and $$\beta_2=\frac{R_2}{R+R_2} \tag{15}$$

where R represents the resistance of variable resistor 119, and $R_1$ and $R_2$ represent the respective resistance values for the resistors 114 and 104. The parameters $\beta_1$ and $\beta_2$ may be thought of as feedback ratios, since they determine the proportions of the output voltages $v_1$ and $v_2$ which are fed back to the bases of the transistors 110 and 100. Values for $\beta_1$ and $\beta_2$ may vary between zero (with $R=\infty$ and thus only negative feedback through the resistors 114 and 104) and unity (with $R_1$ and/or $R_2=\infty$ and thus only positive feedback through resistor 119).

While the emitter-base junctions of the transistors 110 and 100 are reverse biased, the timing capacitors 115 and 105, respectively, discharge toward the respective voltages $\beta_1 V-V_1$, illustrated by the dashed line 131 in FIG. 16 and $-(\beta_2 V-V_2)$, designated by the dashed line 132, along respective exponential curves 133 and 134 (neglecting collector-base forward voltages). The time constants $T_1$ and $T_2$ governing the respective discharge curves 133 and 134 are:

$$T_1=\frac{C_1}{G+G_1} \tag{16}$$

and $$T_2=\frac{C_2}{G+G_2} \qquad (17)$$

where $C_1$ is the capacitance of the capacitor 115, $C_2$ is the capacitance of capacitor 105, G is the conductance (reciprocal resistance) of resistor 119, $G_1$ is the conductance of resistor 114, and $G_2$ is the conductance of resistor 104.

As has been pointed out above, the discharging of the capacitors 115 and 105 is followed by conduction of the associated transistor in its base-driven switching mode. For a discriminator output of around zero the conduction periods are quite short, provided the input source impedance is low. The following first-order analysis assumes that the emitter-collector conduction periods for the transistors 110 and 100 are of negligible duration, and they occur at times when the input signal $u$ changes polarity. Neglecting voltages across forward biased junctions, the following equations may be written from inspection of FIG. 16:

$$x_2=(2U-\beta_1 V)e^{-\tau_1 T_1}=U-(\beta_1 V-V_1) \qquad (18)$$

$$x_2=(2U-\beta_2 V)e^{-\tau_2 T_2}=U-(\beta_2 V-V_2) \qquad (19)$$

It is convenient to define a timing ratio $p$ by:

$$p=\frac{\tau_1}{T_1}=\left(\frac{1}{fT_1}\right)\left(\frac{\tau_1}{\tau_1+\tau_2}\right) \qquad (20)$$

and a symmetry factor $q$ by:

$$q=\frac{T_1\tau_2}{T_2\tau_1} \qquad (21)$$

Substituting Equation 20 into Equation 18 and solving for $V_1$ gives:

$$V_1=U(2e^{-p}-1)-\beta_1 V(e^{-p}-1) \qquad (22)$$

Substituting Equations 21 and 20 into Equation 19 and solving for $V_2$ yields:

$$V_2=U(2e^{-pq}-1)-\beta_2 V(e^{-pq}-1) \qquad (23)$$

Since the total discriminator output V is given by:

$$V=V_1+V_2 \qquad (24)$$

an expression for the discriminator output can be obtained by substituting Equations 22 and 23 into Equation 24 and solving the resulting equation for V to yield:

$$V=\frac{2U(e^{-p}+e^{-pq}-1)}{\beta_1(e^{-p}-1)+\beta_2(e^{-pq}-1)+1} \qquad (25)$$

As was the case with the circuit of FIG. 1, the sensitivity S of the discriminator of FIG. 13 may be expressed as:

$$S=\frac{\Delta V/U}{\Delta f/f}\approx\frac{f}{U}\cdot\frac{dV}{df} \qquad (26)$$

By differentiating Equation 25 with respect to $f$, substituting the result in Equation 26, and letting $V=0$ and $p=p_0$, the sensitivity $S_0$ at the center frequency $f_0$ may be determined as:

$$S_0=2p_0\frac{q(e^{-p_0}-1)+1}{(1-\beta_1)e^{-p_0}+\beta_1-\beta_2} \qquad (27)$$

In order to achieve symmetrical push-pull output at all frequencies, $V_1$ should equal $V_2$. Inspection of Equations 22 and 23 will reveal that this condition is met when $q=1$ and $\beta_1=\beta_2$.

For $\beta_1=\beta_2=\beta$, the expression for sensitivity $S_0$ as set forth in Equation 27 becomes:

$$S_0=\frac{2p_0}{1-\beta}[(1-q)e^{-p_0}+q] \qquad (28)$$

It will be apparent from Equation 28 that as $\beta$ approaches unity the sensitivity theoretically should approach infinity, resulting in instability of the circuit. In practice, it has been found that if the input source impedance is fairly low and the load impedance relatively high, in instability may be produced at values of $\beta$ less than unit. Essentially unity feedback may be provided by making the resistance $R_1$ and $R_2$ very large with respect to the resistance R, as will be evident from the Equations 14 and 15. This will be discussed further with respect to the bistable circuit of FIG. 22.

Figure 17:
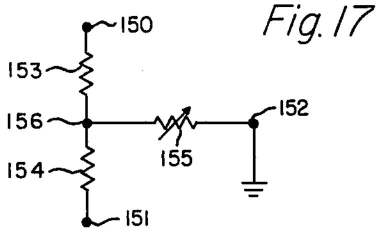
FIG. 17 is a schematic circuit diagram illustrating a modification for the circuit of FIG. 13.

A modification of the push-pull discriminator circuit of FIG. 13 may be provided by removing the resistors 104, 114 and 119 and replacing them with the three-terminal resistive network illustrated in FIG. 17. In the network of FIG. 17 a pair of resistors 153 and 154 are connected in series between first and second terminals 150 and 151, with a variable resistor 155 connected between a third terminal 152 and the junction 156 between the resistors 153 and 154. When the network of FIG. 17 is substituted for resistors 104, 114, and 119 in FIG. 13, the first terminal 150 is connected to the base of the transistor 100, the second terminal 151 is connected to the base of the transistor 110, and the third terminal 152 is connected to the grounded terminal 108. An advantage of this configuration is that the resistor 155 may be used to vary the sensitivity of the circuit without influencing its symmetry.

Figure 18:
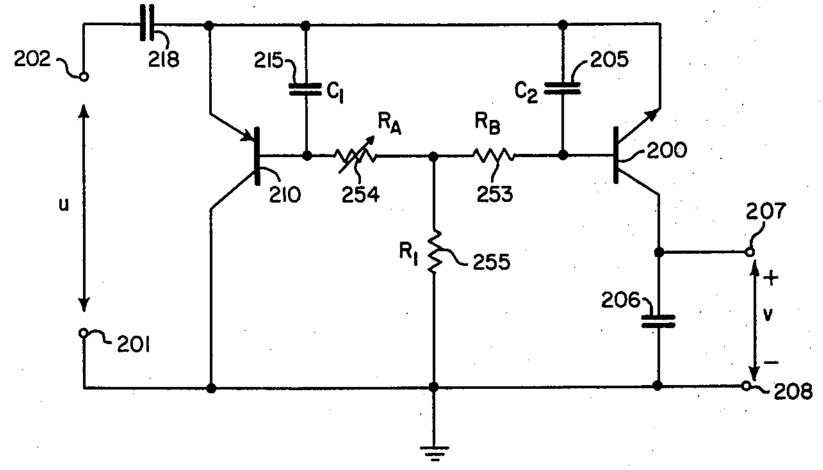
FIG. 18 is a schematic circuit diagram of a single-ended complementary transistor frequency discriminator circuit provided in accordance with a further embodiment of the present invention.

In a further embodiment of the present invention, illustrated in FIG. 18, a single-ended version of the complementary transistor discriminator circuit of FIG. 13 is provided. The circuit of FIG. 18 is quite similar to that of FIG. 13 with the substitution of the resistive network of FIG. 17, and those components of the circuit of FIG. 18 having counterpart components in FIGS. 13 and 17 are designated by the same second and third reference numeral digits as their counterpart components, with a "2" being used as the first reference numeral digit instead of a "1." Conversion from the push-pull to the single-ended type of circuit is achieved simply by replacing the capacitor 116 of FIG. 13 with a short circuit (to move the ground level to one of the output terminals), by inserting a coupling capacitor 218 between the non-grounded input terminal and the emitter of the transistors, and by locating the variable resistors in the feedback path of only one of the transistors instead of in the common feedback path.

Analysis of the operation of the circuit of FIG. 18 is similar to that given above with respect to the circuit of FIG. 13. However, since symmetry is no longer required, the sensitivity of the circuit of FIG. 18 may be varied by only feedback $\beta_1$ around the transistor 210, with the feedback factor $\beta_2$ around the transistor 200 being made unity by providing an infinite resistance across the base-collector of the transistor 200. Expressions for the feedback factors $\beta_1$ and $\beta_2$ and the time constants $T_1$ and $T_2$ for the circuit of FIG. 18 are given below by the respective Equations 29 through 32, which replace Equations 14 through 17 in the analysis:

$$\beta_1=\frac{R_1}{R_B+R_1}=\beta \qquad (29)$$

$$\beta_2=1 \qquad (30)$$

$$T_1=\left[R_A+\frac{1}{G_1+F_B}\right]C_1 \qquad (31)$$

$$T_2=\left[R_B+\frac{1}{G_1+G_A}\right]C_2 \qquad (32)$$

In Equations 29 through 32 $R_1$ and $G_1$ represent the respective resistance and conductance (reciprocal resistance) of the resistor 255, $R_A$ and $G_A$ the respective resistance and conductance of resistor 254, $R_B$ and $G_B$ the respective resistance and conductance of resistor 253, while $C_1$ and $C_2$ represent the capacitance of capacitors 215 and 205, respectively.

Analysis of the circuit of FIG. 18 results in the waveforms shown in FIG. 16, except that the zero volt level (ground) is shifted to coincide with the level $-V_1$, and therefore, the waveform at the emitters of the transistors is located above the input waveform $\mu$ by an amount $V_1$. The voltage $V_1$ appears across the capacitor 218, and the output voltage V appears across the capacitor 206. With the aforementioned changes, Equations 20 through 27 apply to the circuit of FIG. 18.

The center frequency sensitivity $S_0$ for the circuit of FIG. 18 is given by:

$$S_0=\frac{2_{p0}}{(1-\beta)}[e^{(q-1)p_0}+q] \quad (33)$$

Again, as the feedback factor $\beta$ approaches unity an unstable condition results. It will also be apparent that $\beta_1$ may be selected equal to unity instead of $\beta_2$ (by making the resistance across the base-collector of the transistor 210 infinite). Moreover, the sign of the discriminator slope (output vs. frequency curve) may be reversed by interchanging the transistors 200 and 210.

In order to reduce the influence of gain variations on the discriminator output it is desirable to employ transistors with high current gain. Moreover, the emitter-base breakdown voltage should be larger than the peak-to-peak amplitude of the input signal. By inserting diodes in series with the emitters, this constraint on the input signal may be eliminated, although the diodes increase the effect of temperature on the circuit behaviour.

In an alternate arrangement for the single-ended circuit of FIG. 18, separate frequency and sensitivity controls are provided to reduce the influence of the tuning control on the sensitivity and at the same time minimize the effect of the sensitivity control on the center frequency. In this embodiment the resistors 253, 254 and 255 of FIG. 18 are replaced by the three-terminal resistive network illustrated in FIG. 19. This resistive network comprises a variable tuning resistor 224 and a potentiometer 225 connected in series between a first terminal 221 and a second terminal 222. A variable tap 226 for the potentiometer 225 is connected through a resistor 227 to a third terminal 223. When the network of FIG. 19 is substituted for resistors 253, 254 and 255 in FIG. 18, the terminal 221 is connected to the base of the transistor 210, the terminal 222 is connected to the base of the transistor 200, and the grounded terminal 223 is connected to the grounded terminals 201 and 208.

Figure 19:
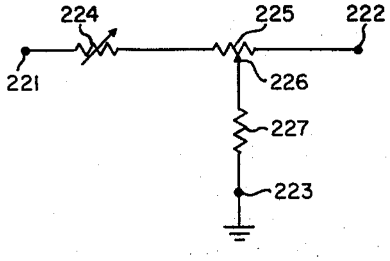
FIG. 19 is a schematic circuit diagram illustrating a modification for the circuit of FIG. 18.

With the control arrangement of FIG. 19, the sensitivity of the discriminator circuit may be adjusted by varying the setting of the tap 226 of the potentiometer 225, thereby varying the feedback $\beta$. Since movement of the potentiometer tap 226 causes one of the time constants $T_1$ and $T_2$ to increase and the other to decrease, the overall effect of the sensitivity control on the center frequency is minimized. The variable resistor 224 may be used to change the center frequency $f_0$ while maintaining the feedback $\beta$ essentially constant. It will be apparent that in the event it is desired to increase the bandwidth of the circuit, the potentiometer tap 226 may be adjusted to reduce the sensitivity of the circuit, thereby affording a corresponding increase in the bandwidth (since a decrease in sensitivity decreases the slope of the output vs. the frequency curve for the discriminator).

Figure 20:
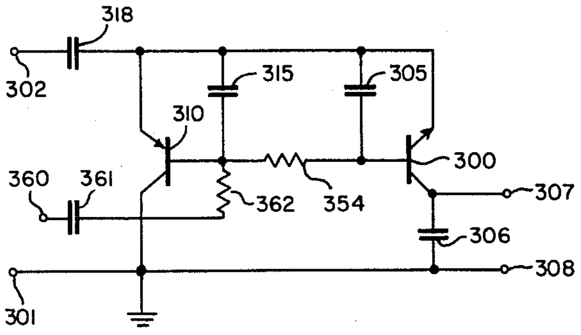
FIG. 20 is a schematic circuit diagram of a discriminator circuit provided in accordance with still another embodiment of the present invention, and which circuit may be used either as a frequency-selective gate or as a frequency discriminator with an electrical center frequency control.

A further embodiment of the present invention, which is illustrated in FIG. 20, provides a discriminator with an electrically controllable center frequency. The circuit of FIG. 20 is similar to the circuit of FIG. 18, and components of the circuit of FIG. 20 having counterpart components in the circuit of FIG. 18 are designated by the same second and third reference numeral digits as their counterpart components except preceded by the numeral "3" instead of "2." The circuit of FIG. 20 differs from that of FIG. 18 in that the resistor 255 of FIG. 18 is removed, and additional circuitry is provided in FIG. 20 to furnish a control voltage. Thus, a resistor 362 and a capacitor 361 are connected in series between the base of the transistor 310 and a control terminal 360 adapted to receive the control signal. It is pointed out that the capacitor 361 is included when an A.C. control voltage is employed but is omitted when a D.C. control voltage is used. Application of the desired control voltage to the terminal 360 alters the level to which the capacitor 315 is charged. This changes the slope of the discharge curve for the capacitor 315, resulting in a change in the center frequency $f_0$ of the discriminator. Such center frequency control is useful in remote control and feedback arrangements for linearization or automatic tuning of the discriminator characteristic, with the usable control range being limited primarily by accompanying sensitivity changes.

Figure 21:
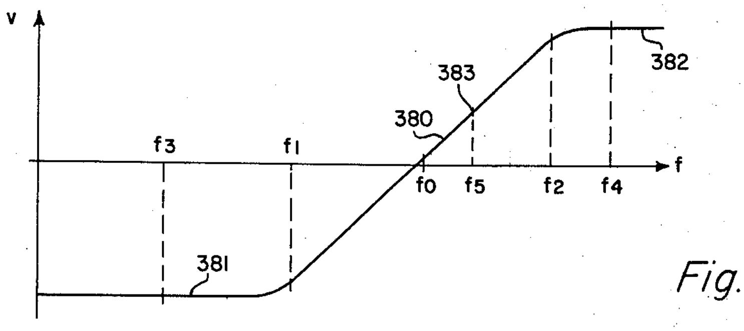
FIG. 21 is a graph illustrating output vs. frequency characteristics for the circuit of FIG. 20 used to illustrate its operation as a frequency-selective gate.

The circuit of FIG. 20 may also find application as a frequency-selective gate, as will now be discussed with reference to FIG. 21. An input signal to be gated (which may be a waveform of any configuration) is applied to the terminal 360, while a variable frequency gating signal is applied to the terminals 302 and 301 of the circuit of FIG. 20. As long as the frequency of the gating signal applied across terminals 302 and 301 is within the bandwidth of the discriminator, i.e., lies between the frequencies $f_1$ and $f_2$, the discriminator operates along the positive slope portion 380 of its characteristic curve (FIG. 21), and the signal applied to the terminal 360 is passed to the output terminals 307 and 308. On the other hand, when the frequency of the gating signal lies outside of the discriminator bandwidth, for example at $f_3$ or $f_4$, the input signal applied to the terminal 360 is blocked because the slope of the respective portions 381 and 382 of the characteristic curve is zero at $f_3$ and $f_4$, and hence there is no change in output magnitude in accordance with the signal to be gated. It is pointed out that if the frequency of the gating signal is at $f_5$, the circuit will operate along the portion of the characteristic 380 centered at the point 383, with an excursion about the point 383 determined by the amplitude of the signal applied to the terminal 360. Thus, the amplitude of the signal to be gated must not be so great that the excursion along the curve 380 exceeds the knee of the curve at $f_2$, or clipping of the waveform will result. Hence, it is desirable to employ a gating signal frequency of $f_0$ in order to allow a maximum amplitude for the signal to be gated.

Figure 22:
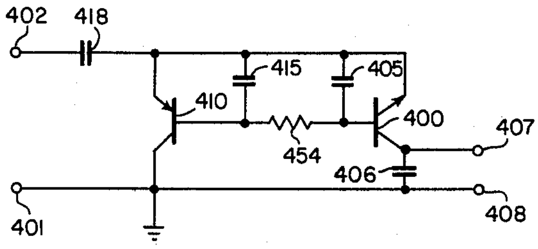
FIG. 22 is a schematic circuit diagram of a bistable frequency discriminator circuit provided in accordance with still another embodiment of the present invention.

As has been mentioned above, when both feedback factors $\beta_1$ and $\beta_2$ approach unity (by making the resistances $R_1$ and $R_2$ of FIG. 13 infinite) the mathematical analysis predicts instability for the circuit. In practice, however, such a circuit is found to be bistable, under control of the frequency of its input signal. A bistable circuit of this type is illustrated in FIG. 22. The circuit of FIG. 22 is identical to the circuit of FIG. 20 except that the circuitry applying the control signal to the base of the transistor 310 is removed. Therefore, components of the circuit of FIG. 22 are designated by the same second and third reference numeral digits as their corresponding components in the circuit of FIG. 20, with a "4" being used as the first reference numeral digit instead of a "3." Although a single-ended version of the bistable circuit is shown in FIG. 22, it should be understood that a push-pull version is also possible and may be provided simply by replacing the capacitor 418 with a short circuit, removing the connection between the collector of the transistor 410 and ground while connecting the collector to the terminal 408 through a capacitor, and taking the output between the terminal 407 and the collector of the transistor 410.

Figure 23:
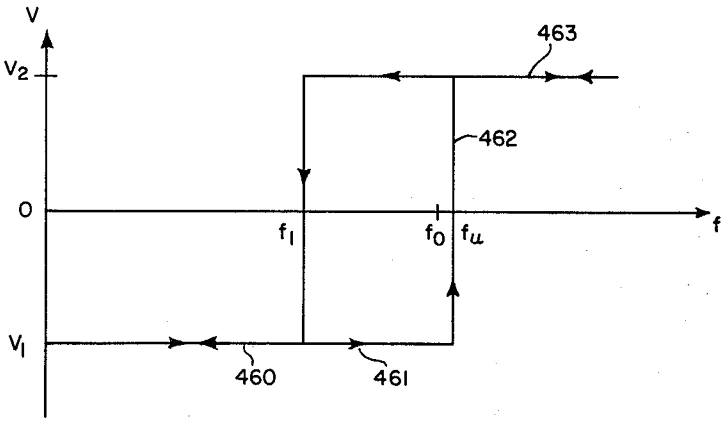
FIG. 23 is a graph illustrating output vs. frequency characteristics for the circuit of FIG. 22.

In the operation of the circuit of FIG. 22, now to be discussed with reference to FIG. 23, as long as the frequency of input signal applied to the terminals 402 and 401 is below the frequency $f_u$, the circuit operates along the portion 460 of its characteristic curve (FIG. 23) to provide an output at a first level $V_1$. As the input frequency is increased, the operating point on the characteristic curve moves in the direction indicated by the arrow 461. When the input frequency reaches the frequency $f_u$ slightly above the center frequency $f_0$, the operating point traverses the vertical portion 462 of the characteristic curve essentially instantaneously, and the circuit switches to a condition in which an output at a different level $V_2$ is provided. For further increases in the input frequency, the output remains at $V_2$ while the circuit operates along the portion 463 of its characteristic. If the input frequency is now decreased, the output remains at $V_2$ (even for input frequencies below $f_u$) until the frequency $f_1$ is reached, at which time the operating point shifts essentially instantaneously along the portion 464 of the characteristic curve to return the circuit to its original condition in which an output at the level $V_1$ is provided. Thus, a hysteresis effect is achieved for the output vs. frequency characteristic of the bistable circuit of FIG. 22.

Although the present invention has been shown and described with reference to particular embodiments, nevertheless, various changes and modifications obvious to one skilled in the art to which the invention pertains are deemed to be within the spirit and scope of the invention as set forth in the appended claims.

I claim:

1. A frequency discriminator circuit comprising: a signal translating semiconductor device having a first electrode, a second electrode and a control electrode; a resistance device having one terminal connected to said control electrode; a first capacitance device connected directly between said first electrode and said control electrode; means for applying a varying frequency signal between said first electrode and a conductive element; a second capacitance device connected between said second electrode and said conductive element for developing a signal having an amplitude determined by the frequency deviation of said varying frequency signal from a given frequency; and circuit means for coupling another terminal of said resistance device with said second capacitance device.

2. A frequency discriminator circuit comprising: a signal translating semiconductor device having a first electrode, a second electrode and a control electrode; a resistance device having one terminal connected to said control electrode; a first capacitance device connected directly between said first electrode and said control electrode; first and second terminals for receiving an input signal, said first terminal being coupled to said first electrode; a second capacitance device connected between said second electrode and said second terminal; circuit means for coupling another terminal of said resistance device with said second capacitance device; and means coupled with said second capacitance device for obtaining therefrom a signal having an amplitude determined by the frequency deviation of said input signal from a given frequency.

3. A frequency discriminator circuit comprising: a transistor, a resistance device having one terminal connected to the base of said transistor, a first capacitance device connected directly between the base and emitter of said transistor, a second capacitance device having one electrode connected to the collector of said transistor, means for applying a signal of varying frequency between the emitter of said transistor and the other electrode of said second capacitance device, circuit means for coupling another terminal of said resistance device with at least one of the electrodes of said second capacitance device, and means coupled with said second capacitance device for obtaining therefrom a signal having an amplitude determined by the frequency deviation of said varying frequency signal from a given frequency.

4. A frequency discriminator circuit for furnishing an output signal having an amplitude indicative of the frequency deviation of an input signal from a given frequency comprising: a transistor, a resistance device having one terminal connected to the base of said transistor, a first capacitance device connected directly between the base and emitter of said transistor, a second capacitance device having one electrode connected to the collector of said transistor, means for applying said input signal between the emitter of said transistor and the other electrode of said second capacitance device, circuit means for coupling another terminal of said resistance device with said second capacitance device, and means coupled with said second capacitance device for providing said output signal.

5. A frequency discriminator circuit for furnishing an output signal having an amplitude indicative of the frequency deviation of a frequency modulated input signal from a given frequency comprising: a transistor, first and second terminals for receiving said input signal, said first terminal being connected to the emitter of said transistor, a resistor connected directly between said second terminal and the base of said transistor, a first capacitor connected directly between the base and emitter of said transistor, a second capacitor connected between the collector of said transistor and said second terminal, and means connected across said second capacitor for providing said output signal.

6. A frequency discriminator circuit for furnishing an output signal having an amplitude indicative of the frequency deviation of a frequency modulated input signal from a given frequency comprising: a transistor, a first capacitor connected directly between the base and emitter of said transisor, a second capacitor having one electrode connected to the collector of said transistor, means for applying said input signal between the emitter of said transistor and the other electrode of said second capacitor, means coupled to said second capacitor for providing said output signal, and means coupled between said second capacitor and the base of said transistor and including a resistor connected to the base of said transistor for applying at least a portion of said output signal to the base of said transistor.

7. A frequency discriminator circuit for furnishing an output signal having an amplitude indicative of the frequency deviation of a frequency modulated input signal from a given frequency comprising: a transistor, a resistor connected directly between the base and collector of said transistor, a first capacitor connected directly between the base and emitter of said transistor, a second capacitor having one electrode connected to the collector of said transistor, means for applying said input signal between the emitter of said transistor and the other electrode of said second capacitor, and means connected across said second capacitor for providing said output signal.

8. A frequency discriminator circuit for furnishing an output signal having an amplitude indicative of the frequency deviation of a frequency modulated input signal from a given frequency comprising: a transistor, a first capacitor connected directly between the base and emitter of said transistor, a second capacitor having one electrode connected to the collector of said transistor, means for applying said input signal between the emitter of said transistor and the other electrode of said second capacitor, means for inverting the signal developed across said second capacitor, means coupled to said inverting means for providing said output signal, and means coupled between said inverting means and the base of said transistor and including a resistor connected to the base of said transistor for applying at least a portion of said output signal to the base of said transistor.

9. A frequency discriminator circuit for furnishing an output signal having an amplitude indicative of the frequency deviation of a frequency modulated input signal from a given frequency comprising: a transistor, a first capacitor connected directly between the base and emitter of said transistor, a second capacitor having one electrode connected to the collector of said transistor, means for applying said input signal between the emitter of said transistor and the other electrode of said second capacitor, inverting means having its input connected across said second capacitor, means including a potentiometer having a variable tap connected across the output of said inverting means for providing said output signal, and a resistor coupled between the base and said transistor and said variable tap.

10. A frequency discriminator circuit for furnishing an output signal having an amplitude indicative of the frequency deviation of a frequency modulated input signal from a given frequency comprising: a transistor, a first capacitor connecting directly between the base and emitter of said transistor, a second capacitor having one electrode connected to the collector of said transistor, means for applying said input signal between the emitter of said transistor and the other electrode of said second capacitor, inverting means having its input connected across said second capacitors, means including a potentiometer having a variable tap connected across the output of said inverting means for providing said output signal, a first resistor having a first terminal and a second terminal, said first terminal being connected to the base of said transistor, a second resistor connected between the collector of said transistor and said second terminal, and a third capacitor connected between said second terminal and said variable tap of said potentiometer.

11. A frequency discriminator circuit comprising: first and second transistors of complementary types having their emitters connected together, a first capacitance device connected directly between the base and emitter of said first transistor, a second capacitance device connected directly between the base and emitter of the said second transistor, resistance means connected between the bases of said transistors, a third capacitance device having one electrode connected to the collector of said first transistor, means for applying a signal of varying frequency between the emitters of said transistors and the other electrode of said third capacitance device, means coupling the collector of said second transistor to said other electrode of said third capacitance device, and means coupled with said third capacitance device for obtaining therefrom a signal having an amplitude determined by the frequency deviation of said varying frequency signal from a given frequency.

12. A push-pull frequency discriminator circuit for furnishing an output signal having an amplitude indicative of the frequency deviation of a frequency modulated input signal from a given frequency comprising: first and second transistors of complementary types having their emitters connected together, a first capacitance device connected directly between the emitter and base of said first transistor, a second capacitance device connected directly between the emitter and base of said second transistor, resistance means connected between the bases of said transistors, first and second terminals for receiving said input signal, said first terminal being connected to the emitters of said transistors, a third capacitance device connected between the collector of said first transistor and said second terminal, a fourth capacitance device connected between the collector of said second transistor and said second terminal, and means connected across said third and fourth capacitance devices for providing said output signal.

13. A push-pull frequency discriminator circuit for furnishing an output signal having an amplitude indicative of the frequency deviation of a frequency modulated input signal from a given frequency comprising: first and second transistors of complementary types having their emitters connected together, a first capacitor connected directly between the emitter and base of said first transistor, a second capacitor connected directly between the emitter and base of said second transistor, a first resistor connected between the bases of said transistors, a second reistor connected between the base and collector of said first transistor, a third resistor connected between the base and collector of said second transistor, first and second terminals for receiving said input signal, said first terminal being connected to the emitters of said transistors, a third capacitor connected between the collector of said first transistor and said second terminal, a fourth capacitor connected between the collector of said second transistor and said second terminal, and means connected across said third and fourth capacitors for providing said output signal.

14. A push-pull frequency discriminator circuit according to claim 13 wherein said first resistor is variable, whereby the center frequency of the circuit may be varied.

15. A push-pull frequency discriminator circuit for furnishing an output signal having an amplitude indicative of the frequency deviation of a frequency modulated input signal from a given frequency comprising: first and second transistors of complementary types having their emitters connected together, a first capacitor connected directly between the emitter and base of said first transistor, a second capacitor connected directly between the emitter and base of said second transistor, first and second resistors connected in series between the bases of said transistors, first and second terminals for receiving said input signal, said first terminal being connected to the emitters of said transistors, a third capacitor connected between the collector of said first transistor and said second terminal, a fourth capacitor connected between the collector of said second transistor and said second terminal, a third resistor connected between said second terminal and the junction between said first and second resistors, and means connected across said third and fourth capacitors for providing said output signal.

16. A push-pull frequency discriminator circuit according to claim 15 wherein said third resistor is variable, whereby the sensitivity of the circuit may be varied.

17. A frequency discriminator circuit comprising: first and second transistors of complementary types having their emitters connected together, a first capacitance device connected directly between the emitter and base of said first transistor, a second capacitance device connected directly between the emitter and base of said second transistor, resistance means connected between the bases of said transistors, first and second terminals for receiving an input signal of varying frequency, said second terminal being connected to the collector of said second transistor, a third capacitance device connected between said second terminal and the collector of said first transistor, a fourth capacitance device connected between said first terminal and the emitters of said transistors, and means connected across said third capacitance device for obtaining therefrom a signal having an amplitude determined by the frequency deviation of said input signal from a given frequency.

18. A frequency discriminator circuit for furnishing an output signal having an amplitude indicative of the frequency deviation of a frequency modulated input signal from a given frequency comprising: first and second transistors of complementary types having their emitters connected together, a first capacitor connected directly between the emitter and base of said first transistor, a second capacitor connected directly between the emitter and base of said second transistor, first and second terminals for receiving said input signal, said second terminal being connected to the collector of said second transistor, a third capacitor connected between said second terminal and the collector of said first transistor, a fourth capacitor connected between said first terminal and the emitters of said transistors, first and second resistance means connected in series between the bases of said transistors, third resistance means connected between said second terminal and the junction between said first and second resistance means, and means connected across said third capacitor for providing said output signal.

19. A frequency discriminator circuit according to claim 18 wherein at least one of said first and second resistance means is variable, whereby at least the center frequency of the circuit may be varied.

20. A frequency discriminator circuit for furnishing an output signal having an amplitude indicative of the frequency deviation of a frequency modulated input signal from a given frequency comprising: first and second transistors of complementary types having their emitters connected together, a first capacitor connected directly between the emitter and base of said first transistor, a second capacitor connected directly between the emitter and base of said second transistor, first and second terminals for receiving said input signal, said second terminal being connected to the collector of said second transistor, a third capacitor connected between said second terminal and the collector of said first transistor, a fourth capacitor connected between said first terminal and the emitters of said transistors, a variable resistor and a potentiometer having a variable tap connected in series between the bases of said transistors, resistance means connected between said second terminal and said variable tap, and means connected across said third capacitor for providing said output signal.

21. A frequency discriminator circuit for furnishing an output signal having an amplitude indicative of the frequency deviation of a frequency modulated input signal from a center frequency comprising: first and second transistors of complementary types having their emitters connected together, a first capacitor connected directly between the emitter and base of said first transistor, a second capacitor connected directly between the emitter and base of said second transistor, a resistor connected between the bases of said transistors, first and second terminals for receiving said input signal, said second terminal being connected to the collector of said second transistor, a third capacitor connected between said second terminal and the collector of said first transistor, a fourth capacitor connected between said first terminal and the emitters of said transistors, means connected across said third capacitor for providing said output signal, and control means for applying an electrical control signal to the base of said second transistor to vary said center frequency.

22. A frequency discriminator circuit according to claim 21 wherein said control signal is a direct voltage, and wherein said control means includes a control terminal for receiving said direct voltage and a resistor connected between said control terminal and the base of said second transistor.

23. A frequency discriminator circuit according to claim 21 wherein said control signal is an alternating voltage, and wherein said control means includes a control terminal for receiving said control voltage and a resistor and a capacitor connected in series between said control terminal and the base of said second transistor.

24. A frequency discriminating gating circuit for providing an output signal of essentially the same form as an input signal when an applied gating signal is of a frequency within a predetermined frequency range, while blocking said input signal when the gating signal is of a frequency not within said predetermined frequency range comprising: first and second transistors of complementary types having their emitters connected together; a first capacitor connected directly between the emitter and base of said first transistor; a second capacitor connected directly between the emitter and base of said second transistor; a first resistor connected between the bases of said transistors; first, second and third terminals, with said first and second terminals adapted to receive said gating signal and said second and third terminals adapted to receive said input signal; said second terminal being connected to the collector of said second transistor; a third capacitor connected between said second terminal and the collector of said first transistor; a fourth capacitor connected between said first terminal and the emitters of said transistors; a fifth capacitor and a second resistor connected in series between said said third terminal and the base of said second transistor; and means connected across said third capacitor for providing said output signal.

25. A bistable frequency discriminating circuit for providing an output signal at a first level when the frequency of an input signal is above a predetermined frequency and for providing an output signal at a difference level when the frequency of the input signal is below a preselected frequency comprising: first and second transistors of complementary types having their emitters connected together, a first capacitor connected directly between the emitter and base of said first transistor, a second capacitor connected directly between the emitter and base of said second transistor, resistance means connected between the bases of said transistors, first and second terminals for receiving said input signal, said second terminal being connected to the collector of said second transistor, a third capacitor connected between said second terminal and the collector of said first transistor, a fourth capacitor connected between said first terminal and the emitters of said transistors, and means connected across said third capacitor for providing said output signal.

References Cited by the Examiner

UNITED STATES PATENTS

| | | | |
|---|---|---|---|
| 2,878,384 | 3/1959 | Holmes | 329—103 X |
| 2,891,156 | 6/1959 | Crow. | |
| 2,918,573 | 12/1959 | Hollmann | 325—487 X |

HERMAN KARL SAALBACH, *Primary Examiner.*

ALFRED L. BRODY, *Examiner.*